(12) United States Patent
Magaldi et al.

(10) Patent No.: US 12,345,448 B2
(45) Date of Patent: Jul. 1, 2025

(54) DEVICE FOR THE STORAGE OF THERMAL ENERGY OF SOLAR ORIGIN BASED UPON MULTIPLE REFLECTIONS

(71) Applicant: MAGALDI POWER S.P.A., Rome (IT)

(72) Inventors: Mario Magaldi, Salerno (IT); Fulvio Bassetti, Salerno (IT)

(73) Assignee: MAGALDI POWER S.P.A., Rome (IT)

( * ) Notice: Subject to any disclaimer, the term of this patent is extended or adjusted under 35 U.S.C. 154(b) by 498 days.

(21) Appl. No.: 17/759,157

(22) PCT Filed: Feb. 3, 2020

(86) PCT No.: PCT/IB2020/050828
§ 371 (c)(1),
(2) Date: Jul. 20, 2022

(87) PCT Pub. No.: WO2021/156649
PCT Pub. Date: Aug. 12, 2021

(65) Prior Publication Data
US 2023/0064799 A1    Mar. 2, 2023

(51) Int. Cl.
*F24S 60/00* (2018.01)
*F24S 10/30* (2018.01)
(Continued)

(52) U.S. Cl.
CPC .............. *F24S 60/00* (2018.05); *F24S 10/30* (2018.05); *F24S 20/20* (2018.05); *F24S 20/25* (2018.05);
(Continued)

(58) Field of Classification Search
CPC ........ F24S 60/00; F24S 23/00; F24S 2080/03; F24S 20/25; F24S 2023/87; F24S 10/30;
(Continued)

(56) References Cited

U.S. PATENT DOCUMENTS

| | | | |
|---|---|---|---|
| 3,908,632 A * | 9/1975 | Poulsen | F24S 80/20 |
| | | | 34/589 |
| 4,455,153 A | 6/1984 | Jakahi | |

(Continued)

FOREIGN PATENT DOCUMENTS

| | | | | |
|---|---|---|---|---|
| CA | 2992411 A1 * | 2/2017 | | F03G 6/06 |
| DE | 102016216733 A1 * | 12/2017 | | F24J 2/07 |

(Continued)

OTHER PUBLICATIONS

Machine Translation of DE 102016216733 (Year: 2017).*
(Continued)

*Primary Examiner* — Steven B McAllister
*Assistant Examiner* — Amy E Carter
(74) *Attorney, Agent, or Firm* — LUCAS & MERCANTI, LLP (57) ABSTRACT

A device is disclosed for the storage and transfer of solar thermal energy which includes a casing having a irradiation opening for the entry of incident solar radiation in a irradiation region of the casing. a bed of fluidizable solid particles received within the casing, and a plurality of reflecting and radiating surfaces arranged within the irradiation region and configured to convey the solar radiation entering through the irradiation opening, after multiple reflections, on the bed of particles.

23 Claims, 4 Drawing Sheets

(51) Int. Cl.
- *F24S 20/20* (2018.01)
- *F24S 20/25* (2018.01)
- *F24S 23/00* (2018.01)
- *F24S 23/70* (2018.01)
- *F24S 23/79* (2018.01)
- *F24S 80/00* (2018.01)
- *F24S 80/20* (2018.01)
- *F28D 13/00* (2006.01)
- *F28D 20/00* (2006.01)

(52) U.S. Cl.
CPC ............... *F24S 23/00* (2018.05); *F24S 23/79* (2018.05); *F24S 80/20* (2018.05); *F28D 13/00* (2013.01); *F28D 20/0056* (2013.01); *F24S 2023/84* (2018.05); *F24S 2023/87* (2018.05); *F24S 2080/03* (2018.05); *F28D 2020/0078* (2013.01)

(58) Field of Classification Search
CPC ........ F24S 23/77; F24S 2023/79; F24S 40/10; F24S 80/20; F24S 20/20; F24S 20/40; F28D 20/0056; F28D 2020/0078; F28D 13/00; Y02E 10/44
USPC ............... 126/714, 617, 620, 619, 618
See application file for complete search history.

(56) References Cited

U.S. PATENT DOCUMENTS

| | | |
|---|---|---|
| 4,727,930 A | 3/1988 | Bruckner et al. |
| 9,347,690 B2 | 5/2016 | Ma |
| 2013/0042857 A1* | 2/2013 | Magaldi ................ F24S 60/00 126/714 |
| 2014/0026883 A1 | 1/2014 | Chen |
| 2015/0090251 A1* | 4/2015 | Magaldi ................ F24S 23/79 126/714 |
| 2017/0145324 A1* | 5/2017 | Kodama ............. F28D 20/0056 |

FOREIGN PATENT DOCUMENTS

| | | |
|---|---|---|
| EP | 3332177 B1 | 6/2019 |
| WO | 2011027309 A2 | 3/2011 |
| WO | 2011135501 A2 | 11/2011 |
| WO | 2012049655 A1 | 4/2012 |
| WO | 2013150347 A1 | 10/2013 |
| WO | 2014038553 A1 | 3/2014 |
| WO | 2018142292 A1 | 8/2018 |

OTHER PUBLICATIONS

International Search Report and Written Opinion for Corresponding International Application No. PCT/IB2020/050828, 13 pages, Apr. 28, 2020.

* cited by examiner

DEVICE FOR THE STORAGE OF THERMAL ENERGY OF SOLAR ORIGIN BASED UPON MULTIPLE REFLECTIONS

CROSS-REFERENCE TO RELATED APPLICATIONS

This application is a 371 of PCT/IB2020/050828, filed Feb. 3, 2020.

TECHNICAL FIELD OF THE INVENTION

The present invention relates to a device, a plant and a method for the storage and transfer of thermal energy of solar origin.

In particular, the invention relates to the field of the devices for the storage of thermal energy using a bed of fluidizable particles.

BACKGROUND OF THE INVENTION

Plants for the production of electric energy starting from the thermal energy associated to a concentrated solar radiation are known. Some of these plants are based upon so-called fluidized-bed devices receiving the solar radiation. The latter generally include an optical system of "beam down" type, configured to concentrate the solar radiation, from the top, on a bed of fluidizable solid particles acting as storage of thermal energy. Such energy, in direct form or form transformed into electric energy, then can be used, even in deferred way, for industrial uses.

The above-mentioned optical system associated to this type of plants consists in one or more fields of heliostats arranged on the ground, conveying the solar radiation on a secondary mirror positioned at high altitude with respect to the fluidized-bed receiver and reflecting the concentrated radiation inside the receiver itself.

Some among the greatest problems of the above-mentioned plant configuration are indeed linked to the optical system associated thereto.

In particular, the above-mentioned secondary mirror of known art can operate at limited maximum temperatures (typically up to about 200° C.), which place a restrictive constraint to the solar flow which can be concentrated thereon and request, the flow being equal, quite extended reflecting surfaces. Such reflecting surfaces—and the relative structures for elevating and supporting at high altitude—have to be devised to resist to high wind pushes and, even for this reason, have a considerable impact on plant costs. Moreover, in some sites wherein the winds are particularly strong, the use of the "beam down" optical system results to be prevented.

Another criticality of the known plants relates to the energy effectiveness of the above-mentioned system for collecting the solar radiation. In particular, the secondary mirror has a reflection effectiveness assessable between 80% and 95%, depending upon the used material and the properties of the adopted reflecting surfaces.

Moreover, the secondary reflector of the "beam down" optical system of known art involves additional problems of practical character, affecting negatively the capability of concentrating the solar energy inside the receiver. In particular, the secondary reflector is subjected to: possible assembly inaccuracy; not perfect planarity of the reflecting surface, which can deform locally due to thermal distortions; fouling phenomena, with need for complex maintenance procedures, to be performed at high altitude; deformations due to wind pushes and/or to climatic variations.

SUMMARY OF THE INVENTION

The technical problem placed and solved by the present invention is then to provide a device, a plant and a method for the storage and transfer of thermal energy of solar origin allowing to overcome the drawbacks mentioned above with reference to the known art.

The invention provides a device, a plant and a method based upon a bed of fluidizable particles which is exposed to a solar radiation after a reflection of the latter at one or more internal walls, or surfaces, belonging to, or which are housed in, a casing including the bed itself.

In particular, the solar radiation is concentrated by a field of heliostats arranged on the ground and enters the receiver device through an opening, the latter preferably made on a side wall of the above-mentioned casing. The solar radiation entering through the opening hits one or more inner walls arranged in an empty region placed above the fluidized bed of particles, that is the freeboard thereof. Such inner walls have reflecting and/or re-radiating surfaces configured to receive the incident concentrated solar radiation and to reflect it towards the bed of particles both directly, and indirectly after multiple reflections on other inner surfaces.

The energy fraction not reflected by the inner walls is absorbed by the same. In a preferred embodiment, the transmission of such absorbed energy to the external environment is prevented thanks to the use of materials or thermal insulating means associated to the walls themselves, in case as integrating portions thereof. In this way, the reflecting surfaces raise their own temperature and re-radiate the thermal energy towards the bed of particles, both directly and indirectly through re-radiations between the other internal surfaces.

In other terms, the vacant area, or irradiation region, delimited by the upper surface, or freeboard, of the bed of particles and by the inner walls of the device placed above said bed surface behaves as a radiating cavity, wherein the surfaces reflect and re-radiate the entering solar radiation according to their specific properties, directly or indirectly towards the bed of particles.

Thanks to the high thermal diffusivity of the fluidized bed, the energy reflected—and in case re-radiated—by the walls is transmitted to the whole mass constituting the fluidized bed, which then can contain and store it until subsequent use.

In a preferred embodiment, the fluidized bed is constituted by solid particles with preferably higher absorbance value than that of the above-mentioned reflecting walls, so as to favour the quick transfer of the energy reflected—and in case re-radiated—by the walls towards the fluidized bed itself.

In embodiment variants, the fluidized bed can consist of particles made of sand or other granular material.

In preferred configurations, the bed particles reach maximum temperatures preferably ≥620° C.

In a preferred embodiment, the reflecting surfaces have a high resistance to high temperatures, preferably over 1000° C., and/or a higher reflectivity than that of the bed of particles, preferably higher than 60% if calculated with reference to the standard regulations ASTM G173 and ISO7668.

The bed of particles is fluidized by means of a system for supplying and distributing a fluidization gas, typically air.

The fluidization can involve a specific operating region of the bed or the whole bed of particles. Advantageously, the fluidization system can provide several fluidization units activable independently from one another.

In embodiment variants, the device can provide an additional thermal feeding of the bed of particles with heating components, such as for example electrical resistances, heat pumps or dedicated heat exchangers, in particular dipped into the bed itself. Such dedicated heat exchangers can provide a circulation of air, or another operating fluid, in tube bundles or equivalent elements.

In embodiment variants, additional heating components can be provided, for example electrical resistances, supplying thermal energy to the bed of particles by heating the fluidization air inletting the bed itself.

Advantageously, said heating components and/or additional heating components can be fed, directly or indirectly, by a source of electric energy preferably available in excess, that is residual, with respect to the user needs.

In these embodiments with heating components, the thermal energy accumulated in the bed of particles then can come from two contributions: a contribution of primary energy, that is the solar radiation concentrated by the optical system and absorbed by the bed itself, and a contribution of secondary energy, that is the electric energy converted into thermal energy by means of the above-mentioned heating components.

Such embodiments are particularly advantageous when it is necessary to guarantee a greater availability of thermal energy under any meteorological condition to feed industrial processes requiring continuity.

It will be then appreciated that the invention allows to remove the need for using an optical system of "beam down" type, by overcoming the criticalities associated thereto as described with reference to the known art. In particular, the device, the plant and the method of the invention result to be particularly effective to guarantee a greater collection effectiveness, a plant simplification and a cost reduction.

In a simultaneous or deferred way, the thermal energy accumulated in the bed of particles then can be transformed into electric energy, used as thermal energy or even used in combined, and flexible, way, in such two forms.

The device, the plant and the method of the invention then can be used for the programmable production of electric energy, for the adjustment of the electric networks and/or as thermal energy in other users.

The device of the invention can constitute a multipliable module-unit depending upon the specific needs to produce with continuity (24/365) electrical and/or thermal energy in the service of communities and industrial plants.

The thermal energy accumulated in the bed of particles can even be used directly through the heated fluidization gas outletting the bed itself.

Thermal exchange means can be provided configured to recover and/or disperse the thermal energy from the above-mentioned reflecting and/or re-radiating surfaces if the temperature reached thereby is so as to alter the state or to compromise the functionality thereof.

The invention represents and eco-compatible, durable, effective and cheap alternative to the current systems for the production of thermal or electric energy of solar origin.

Additional advantages, features and use modes of the present invention will result evident from the following detailed description of some embodiments thereof, shown by way of example and not with limitative purposes.

BRIEF DESCRIPTION OF FIGURES

The figures of the enclosed drawings will be referred to, wherein.

The representations of the above-mentioned figures are meant by pure way of example and the components and the distances are not necessarily shown in proportion.

DETAILED DESCRIPTION OF PREFERRED EMBODIMENTS

Embodiments and variants of the invention will be described hereinafter, and this with reference to the above-mentioned figures.

Analogous components are designated in the several figures with the same numeral reference.

In the following detailed description, additional embodiments and variants with respect to embodiments and variants already treated in the description itself will be illustrated limitedly to the differences with what already illustrated.

Moreover, the several embodiments and variants described hereinafter are likely to be used in combination, where compatible.

Figure 1:
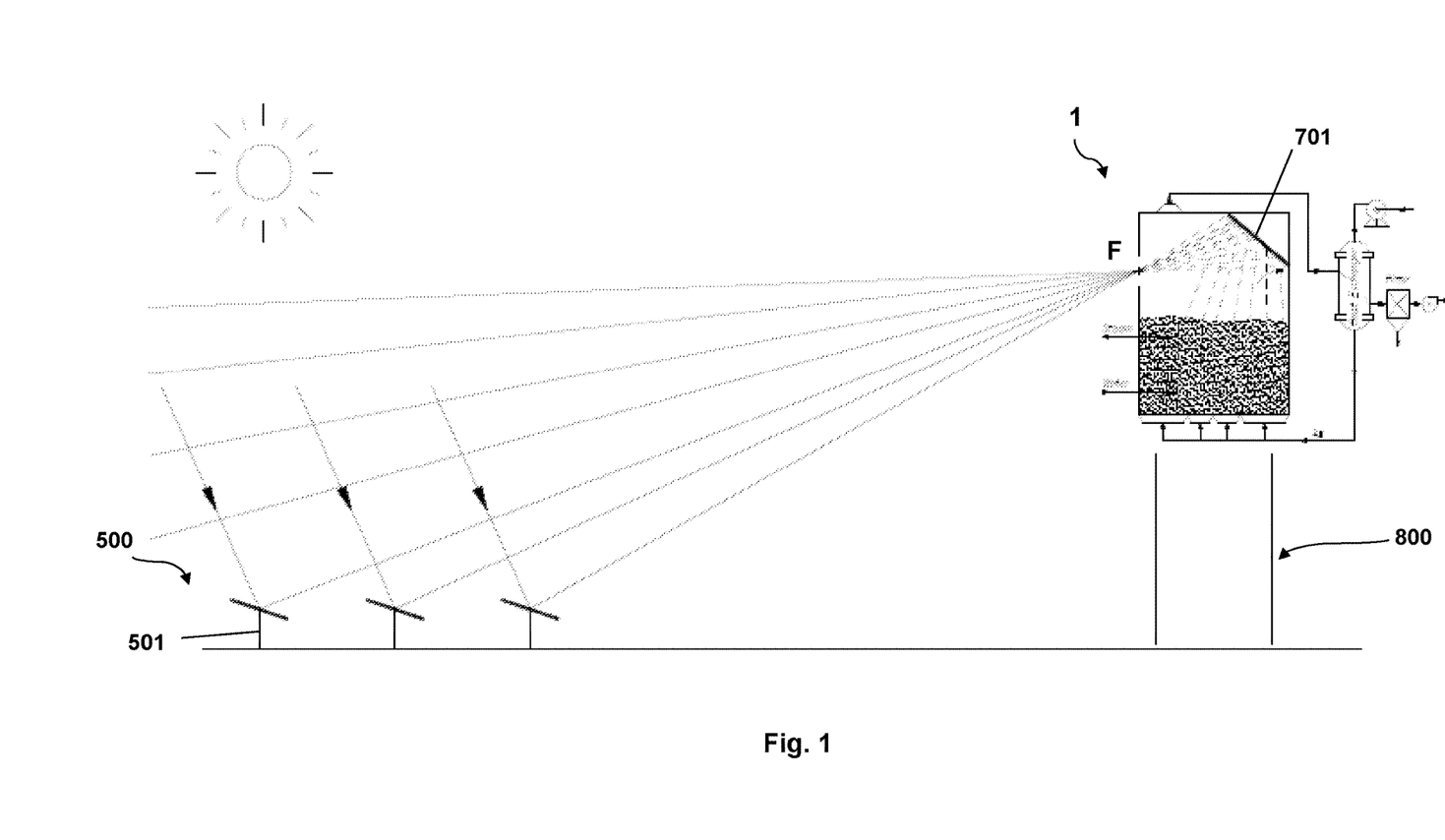
FIG. 1 shows a schematic assembly representation, in side and partial longitudinal section, of a device for the storage and transfer of thermal energy according to a first preferred embodiment of the invention, highlighting the interaction between the device itself and a system for collecting the solar radiation associated thereto.

With reference to FIG. 1, a device for the storage and exchange of thermal energy of solar origin, or receiver, according to a first preferred embodiment of the invention is designated as a whole with 1.

The device 1 of the present embodiment is meant to be inserted in a plant for the energy production, in case including a plurality of devices such as the herein considered one.

Figure 2:
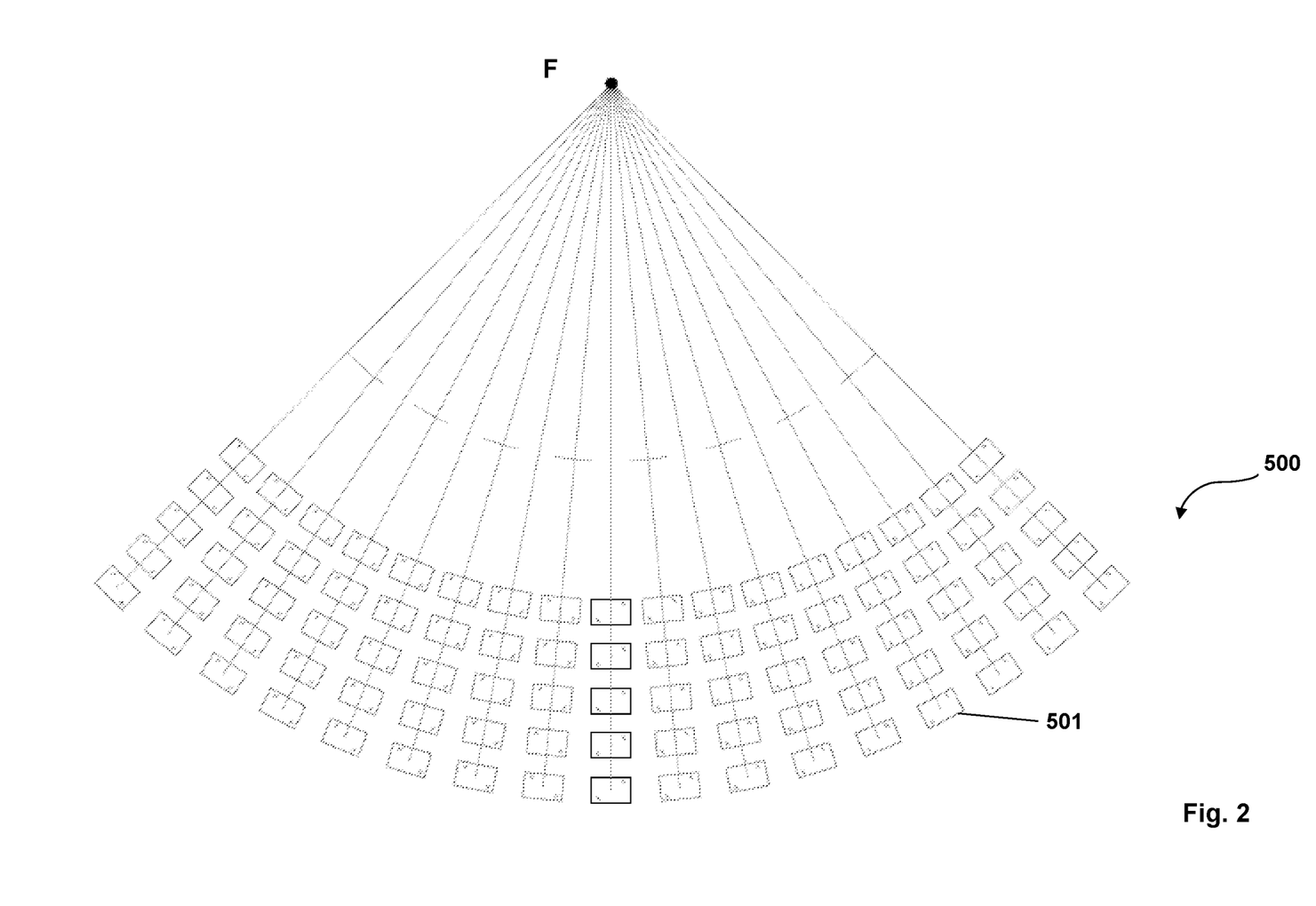
FIG. 2 relates to the same assembly representation of FIG. 1, in top view.

As also shown in FIG. 2, the device 1 is advantageously associated to an optical system for collecting the solar radiation, designated as a whole with 500 and configured to concentrate an incident solar radiation on the device 1 (or on a plurality of devices like the herein considered one). In particular, the optical system 500 can include a plurality of heliostats 501, or equivalent reflecting optical means, arranged on the ground and suitable to collect the incident solar radiation to deviate it/concentrate it at the device 1 and in particular, in the present example, in a common focus F.

The heliostats 501 can be organized in sub-fields, for example arranged according to the cardinal directions.

In the shown configuration, the device 1 is positioned above the resting plane of the heliostats 501, so as to receive the solar radiation concentrated thereby according to a "beam-up" configuration. Therefore, the device 1 is supported at high altitude by means of a structure, for example metallic structure, shown schematically and designated with 800.

Now reference will be made to the enlarged view of FIG. 3 to illustrate some components of the device which are common to the several embodiments illustrated herein. The herein shown device, still designated with 1, first of all comprises a containment casing 2, having, or defining, an inner compartment 20, that latter suitable to house a bed of fluidizable particles 3 thereabout one will speak shortly. The casing 2 can have polygonal, for example cubic or parallelepiped, or cylindrical geometry. In the present example, the casing 2 has an upper wall, or top, 21, a side wall, or skirt 22 and a lower wall, or base, 23.

The casing 2 is implemented so as to insulate thermally the compartment 20 with respect to the outside.

The casing 2 can have a multi-layered construction.

With respect to the geometry of the device 1, and in particular of its casing 2, it is possible to define a longitudinal direction L, in the present example vertical, and a cross direction T, on a plane orthogonal to the longitudinal direction L and in this example, then, horizontal.

The casing 2 has a irradiation opening 10. In the present embodiment, the above-mentioned reflectors 501 concentrate the incident solar radiation indeed inletting such opening 10, or at or near thereof. Advantageously, as said, the radiation is concentrated at one single focus F. The mutual position of the receiver device 1 and of the field heliostats which makes the focus F to correspond with the opening 10 allows to reduce to the minimum the sizes of the opening itself and consequently to decrease the radiative losses and losses by natural convection therethrough.

In general terms, the configuration is so that the radiation is conveyed within the compartment 20.

In the present embodiment, the opening 10 puts in direct communication the inner compartment 20, and then the bed of particles 3 housed therein with the outer environment. In particular, the opening 10, in use, has no closing or shielding means such as for example transparent windows or the like. In other words, the device 1 is configured to operate without closing or shielding means. During not operating periods, the opening can be closed again by means of removable, suitably thermally insulated, means to protect the system and to remove or reduce the dispersion of thermal energy towards the external environment.

Near the above-mentioned opening 10 components, for example shields or barriers, can be positioned, apt to limit the entrance, in the device, of air flows or winds coming from the external environment, without interfering with the concentrated radiation entering the device itself. Moreover, around the opening 10 an additional optical apparatus can be provided, for example under the form of CPC (Compound Parabolic Concentrator), known on itself to the state of art, to allow to recover the whole or a portion of the concentrated solar radiation which in absence thereof could leak outside the opening 10 itself.

Embodiments can be also provided wherein the opening 10 is shielded by means of a transparent window or other equivalent means even during operation.

In the present example, the opening 10 is shown as arranged at the side skirt 22 of the casing 2, near the upper wall 21. Such representation however is to be meant as exemplifying. The opening is limited by a lower margin 230.

Preferably, the freeboard 35 of the bed of particles 3, both under static conditions and in operating fluidization conditions, falls below the lower margin 230.

Preferably, the opening 10 is arranged at a free region, or vacant space, 350 of the compartment 20, limited on the lower side by the freeboard 35 of the bed of particles, laterally by the upper portion of the skirt 22 and on the top by the wall 21. Such region 350 can be defined as irradiation region.

The bed of fluidizable particles 3 is of granular type, that is formed by solid particles.

The type of preferred granular material for the bed of particles of the device 1 is of the type with thermal properties with high thermal capability and diffusivity. An example of preferred granular material is the river sand, which, apart from having said thermal properties, has a natural rounded shape of the particles minimizing the phenomenon of the mutual abrasion of the same.

The inner walls of the casing 2 standing above the bed of particles 3, even when fluidized, are directly or indirectly involved by the solar radiation concentrated by the heliostats 501. Such walls of the irradiation region 350 have reflecting surfaces exposed within the compartment 20 made of materials and/or processing which can have reflectivity properties of different type, as described hereinafter.

Specular—The surface reflects the light in one single direction. The outgoing radiation direction is in the incident plane and the reflection angle is equal to the incidence angle.

Diffuse— The surface reflects the light equally in all directions and the light reflection is independent from the direction and the light reflection is independent from the direction and the entering/incident plane.

Glossy—The surface has a mixed behaviour from specular to diffuse.

In the first embodiment of FIG. 1 a tilted internal wall 701 is provided, which receives directly the concentrated solar radiation and has a reflecting and/or re-radiating surface, identified too with 701, operating in specular mode. The arrangement is so that the incident solar radiation is reflected almost wholly at the freeboard 35 of the bed 3, according to a reflection area corresponding to the cross section of the casing 2.

Figure 3:
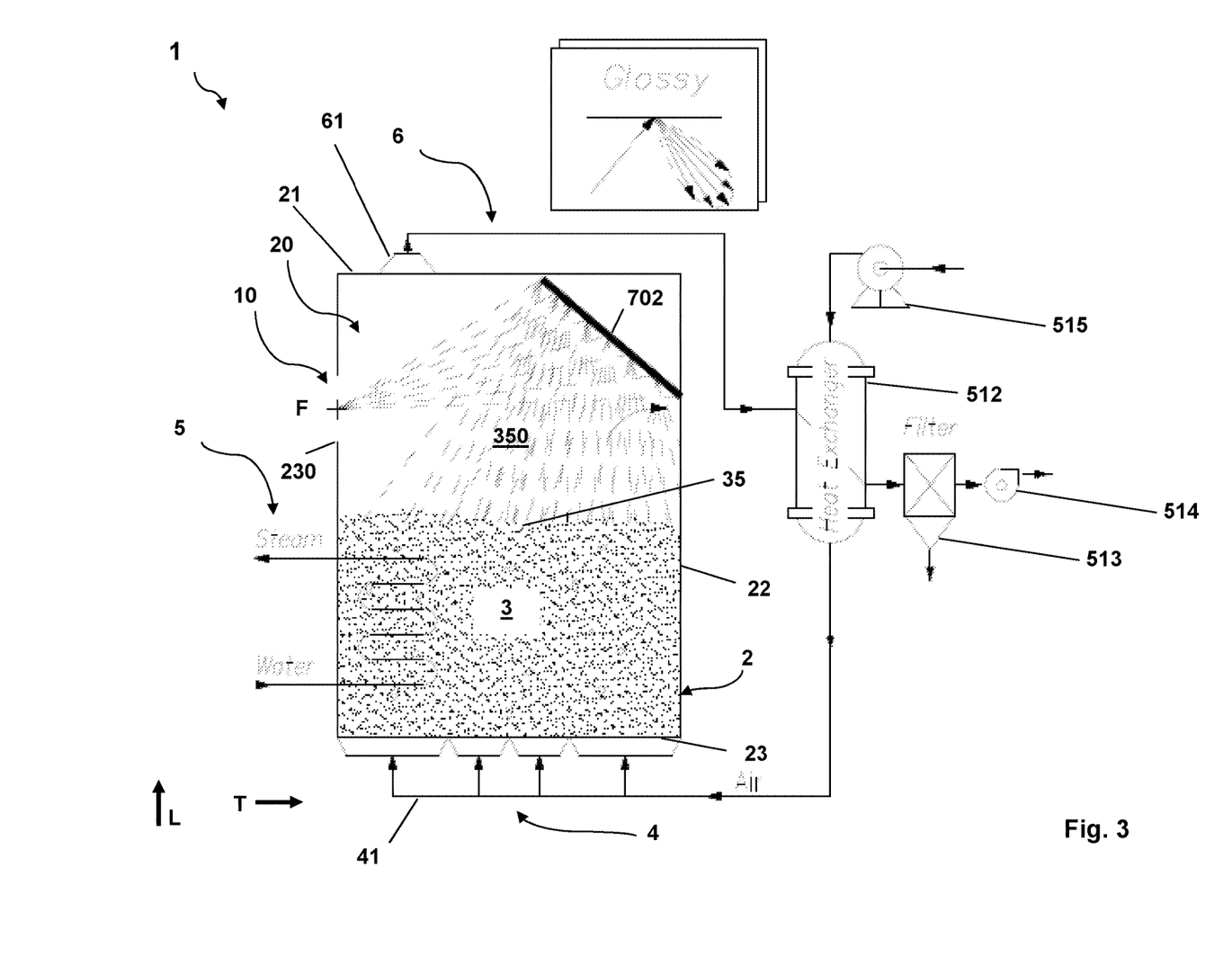
FIG. 3 shows an enlarged view, in side and partial longitudinal section, of a device for the storage and transfer of thermal energy of a second preferred embodiment of the invention, by highlighting a reflection mode of "glossy" type thereof.

In the second embodiment of FIG. 3 the wall, schematized by the tilted shield 702, has a "glossy" optical behaviour.

Figure 4:
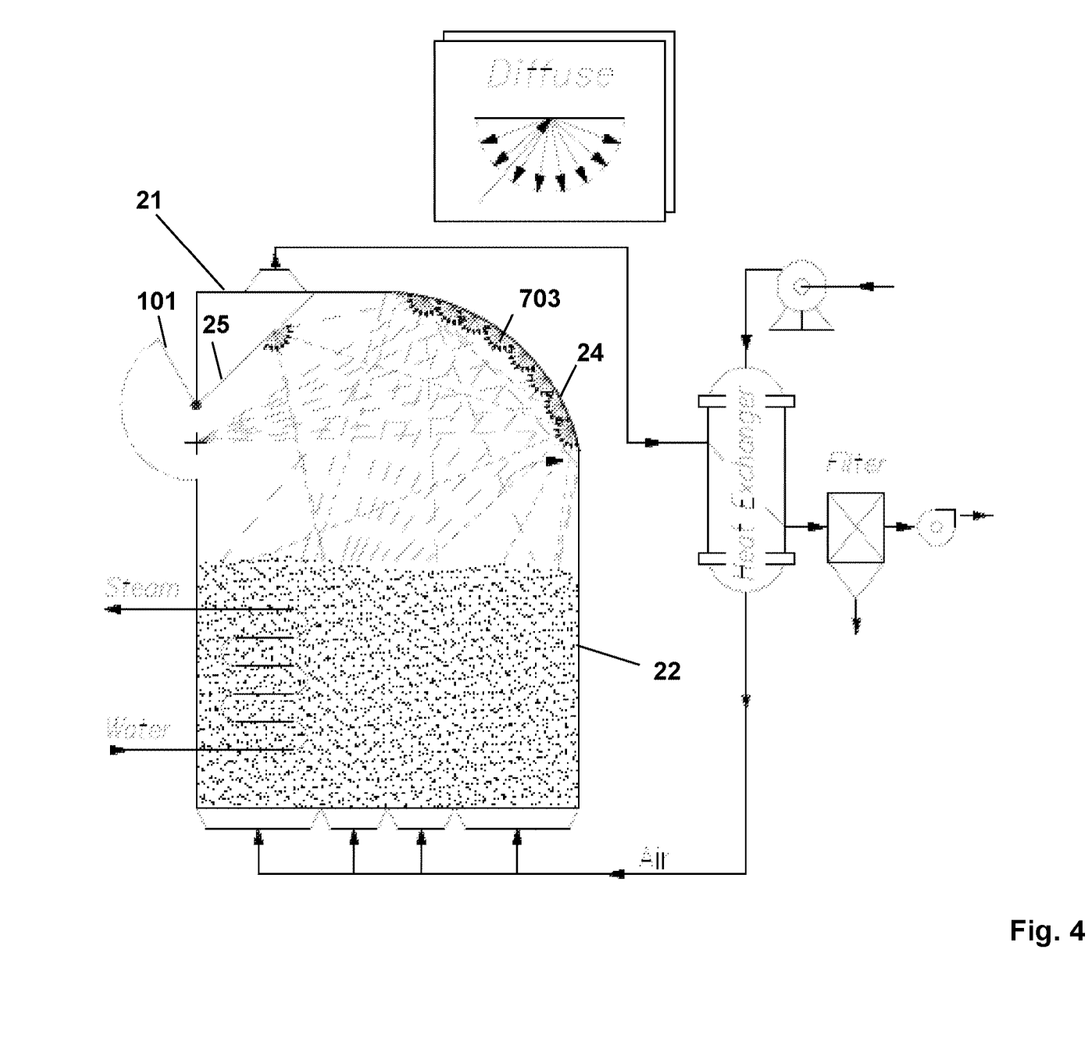
FIG. 4 shows an enlarged view, in side and partial longitudinal section, of a device for the storage and transfer of thermal energy of a third preferred embodiment of the invention, providing a reflection mode of "diffuse" type.

In the third embodiment of FIG. 4 a "diffuse" behaviour is provided by means of a reflecting and/or re-radiating surface 703 belonging to a curved wall 24 joining between side skirt 22 and upper wall 21 of the casing 2. Moreover, in the configuration of FIG. 4 an additional tilted wall, or shield, 25 is also provided, having an auxiliary reflecting and/or re-radiating surface opposed to the surface 24.

Still with reference to FIG. 4, a schematization of a system 101 for closing the irradiation opening 10 is shown, in form of a hinged shield and in open position related to the phase for acquiring the concentrated radiation. The device 101 can be closed when it is not required to acquire energy, but rather to keep it.

Other preferred configurations can provide that (also or only) the inner walls of the casing 2—in particular the portion of side skirt 22 defining the irradiation region 350 and/or the upper wall 21 and/or still joining portions between the latter—have directly one or more reflecting surfaces.

The surface(s) of the inner walls of the casing 2 can result to be flat or with selected profile, so as to allow, even thanks to the mutual view factors, the minimization of the radiant total flow outgoing from the opening 10 and the maximization of the total flow entering the fluidized bed.

Said reflecting and/or re-radiating surfaces are constituted by materials resistant to high temperatures, induced by the high thermal flows thereto they are subjected, such as preferably ceramic tiles, refractory cements and/or analogous materials.

In the above-described configurations, the electromagnetic energy emitted as a whole by the inner surfaces 2, sum of the emitted radiations and the reflected ones, through the mutual view factors, by the surfaces 701-703 is absorbed by the bed of particles 3, advantageously selected with a higher absorption coefficient than all surfaces exposed to the concentrated solar radiation.

In particular, the solar radiation reflected by the inner surfaces of the region 350 hits, directly or downwards of multiple reflections, according to the mutual view factors, the bed of particles 3. Moreover, said inner surfaces absorb, according to their own absorption and reflectivity coefficients, a not reflected energy fraction, which causes the temperature raise of such surfaces which then re-radiate the solar energy towards the bed of particles, both directly and indirectly through re-radiations between the inner surfaces, according to the mutual view factors.

Such configuration determines a device behaviour similar to that of a radiant cavity or black body, when said cavity is equipped with an opening towards outside with reduced sizes with respect to the average sizes of the cavity itself. Under such conditions, almost the whole concentrated solar radiation incident on the opening is repeatedly reflected, absorbed and re-radiated inside the cavity, so that only a minimum fraction thereof succeeds in outgoing and the so-captured solar energy remains accumulated in the fluidized bed of particles.

In the configurations of the above-illustrated figures, the bed of particles 3 is put in motion by means of fluidization means 4 configured to supply and distribute a fluidization gas, in particular air, within the compartment 20. In the present embodiment, the means 4 comprises a plurality of elements supplying or inletting fluidization air 41, arranged at the lower base 23 of the casing 2 that is the base of the bed of particles 3. The route of the fluidization air within the bed of particles 3 is then from bottom upwards, in particular vertical or substantially vertical. In more general terms, the fluidization gas inlet takes place according to the longitudinal direction L.

In the present example, a uniform or substantially uniform fluidization of the bed of particles 3 is provided.

The fluid dynamic regime of the bed 3 allows an effective heat exchange between the particles of its various portions. This is favoured by the fact that the bed particles are subjected to a continuous exchange and recirculation. In use, the particles arranged on the freeboard 35 or near thereto, absorb thermal energy by the reflected or re-radiated solar radiation and they cede it to the other bed particles.

The thermal exchange between the particles is favoured by convective motions determined by the fluidization regime.

Embodiment variants can provide a differentiated fluidization in different regions or portions of the bed 3. The fluidization of several bed regions or portions, or the fluidization regimes selectable therefor, can differentiate for speed, and in case rate, of the flow of fluidization air inletting the bed of particles 3.

The fluidization elements can result to be arranged uniformly at the base of the bed of particles 3, such as in the present example, or to be positioned in differentiated way.

Fluidization elements structurally analogous therebetween and in case controlled differently, for example in terms of speed and/or rate, can further be provided.

The fluidization regime can even be of boiling type and/or, generally, a regime favouring convective motions of particles in the bed 3 or in regions or portions thereof.

In some embodiment variants, the fluidization regime selected for the whole bed or for a region or portion thereof can even be of so-called "spouted" type, for example like jet, fountain or impulse. The fluidized bed of spouted type generally has a hydro dynamic regime characterized by a jet of central fluidization gas at the base of same bed which, due to the strong speed difference between particles directly exposed to the jet and surrounding particles, creates a motion dragged by the bed column insisting on the jet itself and the overlooking (cylindrical) areas by creating, indeed, a fountain-like effect in the central portion fed by the solid dragged in the side portions of the jet.

Within the bed 3 thermal exchange elements 5, in particular tube bundles, are housed. Such exchangers, with continuity or under selected operating conditions, can be crossed by an operating fluid, for example vapour or CO2.

In particular, in a phase of thermal exchange, that is a phase of using the thermal energy accumulated in the bed of particles 3, the operating fluid can be made to flow in the tube bundles 5 and to receive heat from the bed particles. On the contrary, during a phase of pure storage the tube bundles 5 can be at rest, that is in absence of circulation of operating fluid.

The storage phase is activated in presence of sun. The phase of thermal exchange, that is transfer of the thermal energy to the operating fluid, can be activated preferably even in absence of sun.

The operating fluid outletting the device 1 under the conditions of design temperature and pressure can be made to expand in a turbine coupled to a generator for the production of electrical energy or can be used for other industrial purposes, for example for the production of fluid carriers to be used in industrial processes, in particular when thermal energy even at very high temperatures is required with continuity. In other words, in the present example the tube bundles 5 are connected to additional components of the plant, for example one or more turbines, condensers, heat exchangers, pumps and so on, each one known on itself.

The device 1 further comprises means 6 for sucking fluidization air which has ended its own route within the bed of particles 3 and it comes out therefrom at the irradiation region 350. Such sucking means 6 is then configured to suck air within the casing 2 above the freeboard 35 of the bed of particles 3. In the present example, the sucking means 6 comprises elements 61 for collecting air from the vacant space 350, for example in form of hood, arranged at the upper wall 21 of the casing 2.

Preferably, the sucking means 6 is configured even to avoid an emission, or a massive emission, of fluidization air and/or of the particles dragged thereby in the external environment through the opening 10.

Advantageously, the sucking means 6 provides (not represented) control means, preferably rate sensors which, in synergy with additional (not illustrated) control means associated to the fluidization means 4, determine an air flow extracted from the device 1 equal or higher than the fluidization air flow entered the bed of particles 3.

Advantageously, the device 1 provides a heat exchange between the (heated) fluidization air outletting the bed of particles 3 at the freeboard 35 of the latter and sucked by the means 6 and the fluidization air inletting the bed of particles 3 by means of the fluidization means 4. In other words, a heat regeneration is provided, obtained by means of thermal exchange means. This is represented schematically in the figures by means of thermal exchange components 512, components 513 for dedusting fluidization air, components 514 for sucking fluidization air from the external environment and components for inletting air 515 in the fluidization system belonging to the fluidization means 4.

In an embodiment variant, the device 1 has a calm chamber above the freeboard 35 of the bed of particles 3.

Such calm chamber is meant as an area of low or null speed for the bed particles and it is defined, in the present example, by the vacant space 350.

Even the calm chamber contributes to avoid a leak, or a massive leak, of air and/or particles through the opening 10.

An exemplifying configuration of a plant like the one considered above, including a bed of particles of 350 tons, can be implemented with one or more of the following dimensional parameters:

field heliostats of about 10,000 m² of reflecting surface;

minimum focal distance of 60 m and maximum of 200 m wherein the focal distance is defined as distance between the heliostat centre and the focalization point of the parallel solar rays hitting it;

positioning of the inlet opening of the device at about 40 m in elevation with respect to the field of heliostats, that is on the ground;

dimensional ratio between the total extension of the inner reflecting surfaces of the device and of the surface of the inlet opening equal to about 15-20.

The device of the invention has modular nature, that is it fits well to be connected to one or more analogue devices in series or in parallel with respect to the thermal exchange.

Moreover, the types of devices according to the described different forms and embodiment variants can be favourably associated for a greater production and/or operating flexibility of the industrial plant.

Still in a preferred configuration, the plant based upon one or more of the devices of the invention can be advantageously associated to a photovoltaic system providing the daily production of electrical energy. In such configuration, the storage and transfer devices can be managed in regime of storing thermal energy of solar origin during the sunny hours and in regime of transferring thermal energy from twilight on.

Moreover, in the same configuration the plant can be associated to a plant for desalinating or other system for exploiting the thermal energy of solar origin. In this case, the devices can be managed in mixed regime: both for the storage, for the night production of electrical energy, and for contemporary daily transfer, by dedicating the related transfer of thermal energy to the continuous operation of the plant, for example desalinating operation.

The device of the invention can be integrated with plants fed by other sources of renewable energy (for example photovoltaic, wind, geothermal) or not renewable to guarantee the energy production continuity with the purpose of reducing or eliminating the production of energy produced by not renewable sources.

The invention further provides a method for the storage and exchange of thermal energy of solar origin, based upon the functionalities already described above in relation to the device and plant of the invention.

The object of the present invention has been sofar described with reference to preferred embodiments thereof. It is to be meant that other embodiments belonging to the same inventive core may exist, all within the protective scope of the herebelow reported claims.

The invention claimed is:

1. A device for the storage and transfer of thermal energy of solar origin, comprising:

a containment casing, having an irradiation opening configured to allow the entrance of an incident solar radiation in an irradiation region defined within said casing;

a bed of fluidizable particles received within said casing;

a reflecting and/or re-radiating surface arranged within said irradiation region and configured to reflect the solar radiation entering through said irradiation opening directly on a freeboard of said bed of particles or on another reflecting and/or re-radiating surface of said irradiation region; and a plurality of reflecting surfaces arranged within said irradiation region and each reflecting surface configured to reflect the solar radiation entering through said irradiation opening, the overall configuration being such that the inletting radiation hits the freeboard of the bed of particles-downwards of multiple reflections on said reflecting surfaces.

2. The device according to claim 1, further comprising means for supplying a heated fluidization gas outletting said bed of particles to a user.

3. The device according to claim 1, wherein said irradiation opening puts in direct communication said irradiation region of said casing with the outer environment, being deprived, in use, of closing or shielding means.

4. The device according to claim 1, wherein said irradiation opening is arranged at a wall or side skirt of said casing.

5. The device according to claim 1, wherein the freeboard of said bed of particles is arranged below a lower margin of said irradiation opening, when said bed of particles is in a fluidization condition.

6. The device according to claim 1, wherein said reflecting and/or re-radiating surface(s) is (are) configured to re-radiate within said irradiation region thermal energy absorbed by the solar radiation.

7. The device according to claim 1, wherein said reflecting and/or re-radiating surface is implemented on a tilted wall housed within said irradiation region or is associated with a wall defining said casing.

8. The device according to claim 1, wherein said reflecting and/or re-radiating surface has a reflectivity belonging to one of the following schematizations: specular reflectivity, with radiation reflection angle equal to incidence angle; diffuse reflectivity, with reflection in all directions, independently from the radiation incidence plane; glossy reflectivity, with hybrid behaviour between specular and diffuse reflectivity.

9. The device according to claim 1, wherein said casing, except said irradiation opening, is made of thermally insulating materials.

10. The device according to claim 1, wherein the particles of said bed have higher absorbance than that of said reflecting surface(s).

11. The device according to claim 1, further comprising sucking means, configured to suck a fluidization gas above the freeboard of said bed of particles.

12. The device according to claim 1, further comprising heating means thermally connected to said bed of particles, said heating means is configured to transmit thermal energy to said particles.

13. The device according to claim 1, further comprising a supporting structure configured to sustain said casing in elevation above the ground.

14. The device according to claim 1, further comprising thermal exchange means, thermally connected to said bed of particles and which can be activated to receive therefrom thermal energy, the overall configuration being such that said thermal energy is transferred from the inlet solar radiation to the particles of said bed and, at the same or later time, from said particles to said thermal exchange means.

15. The device according to claim 14, wherein said thermal exchange means comprises one or more of the following components: thermoelectric elements; thermionic elements; thermo-photovoltaic elements; tube bundles configured to be crossed, in use, by an operating fluid.

16. The device according to claim 1, further comprising fluidization means configured for inletting a fluidizing gas.

17. The device according to claim 16, further comprising thermal exchange means between a fluidization gas outletting the bed of particles and a fluidization gas inletting the bed of particles.

18. A plant for the production of electric and/or thermal energy, comprising:
one or more devices according to claim 1; and
means for collecting the solar radiation, arranged on the ground,
the configuration being such that the solar radiation is collected by said collection means and concentrated at the irradiation opening of the one or more devices, the irradiation opening of the one or more devices being arranged at a higher elevation than said means for collecting the solar radiation.

19. The plant according to claim 18, wherein said collection means defines a radiation configuration which makes the solar radiation to converge from the bottom on said one or more devices.

20. A method for producing electric and/or thermal energy starting from the thermal energy of a solar radiation, which method provides:
a concentration of the solar radiation at an irradiation opening of a receiver device comprising a bed for the storage of thermal energy of type with fluidizable particles, and
multiple reflections of the solar radiation on the bed of particles by a plurality of reflecting surfaces arranged within said irradiation region, each reflecting surface configured to reflect the solar radiation entering through said irradiation opening, the overall configuration being such that the inletting radiation hits the freeboard of the bed of particles-downwards of multiple reflections on said reflecting surfaces.

21. The method according to claim 20, further comprising a phase of transferring thermal energy by the particles of said bed, selectively activable at the same or later time with respect to a phase for the storage of thermal energy.

22. The method according to claim 20, further comprising a phase of using a heated fluidization gas outletting said bed of particles.

23. The method according to claim 20, further comprising a phase of fluidization of the particles of said bed, which is activated under selected operating conditions.

* * * * *